April 2, 1946.　　G. H. GASCOIGNE ET AL　　2,397,786
HOE
Filed May 22, 1943　　　　2 Sheets-Sheet 1
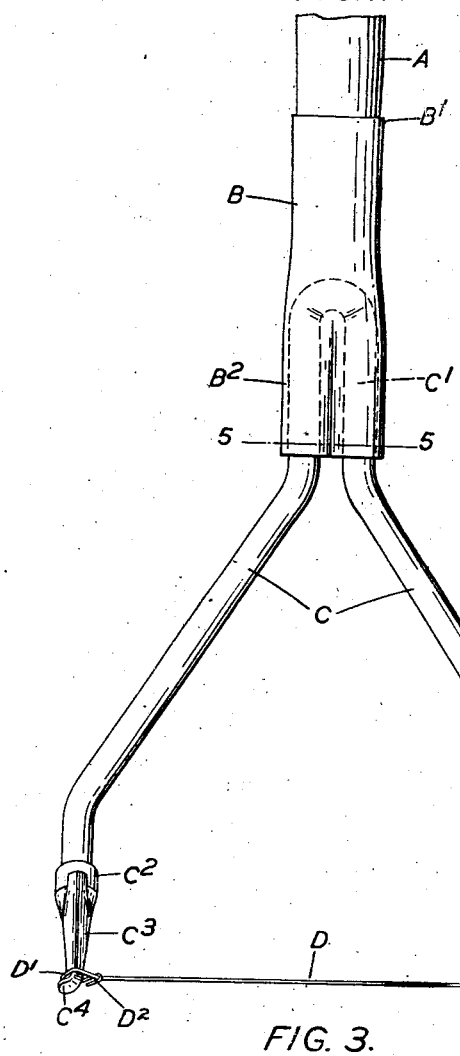
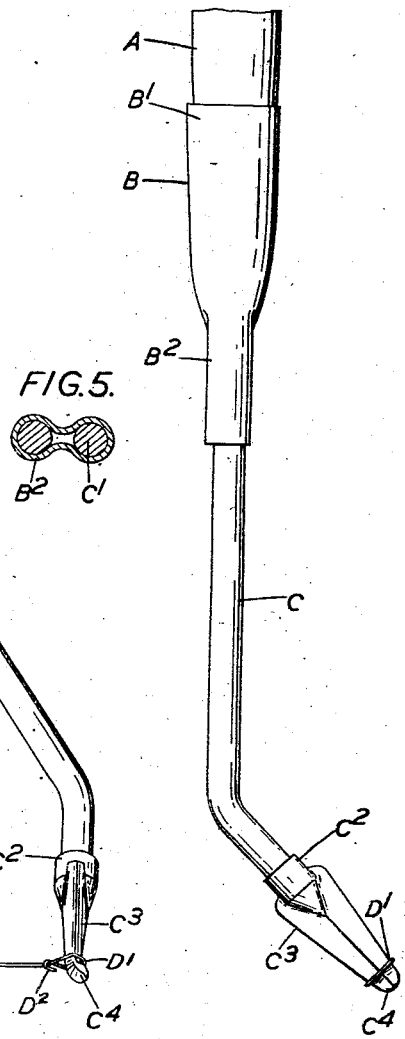
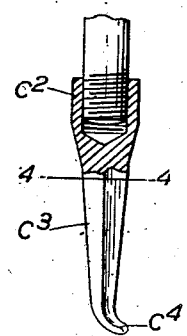
Inventors
G. H. Gascoigne & J. R. Knox
By E. F. Wenderoth
Attorney April 2, 1946.   G. H. GASCOIGNE ET AL   2,397,786
HOE
Filed May 22, 1943   2 Sheets-Sheet 2
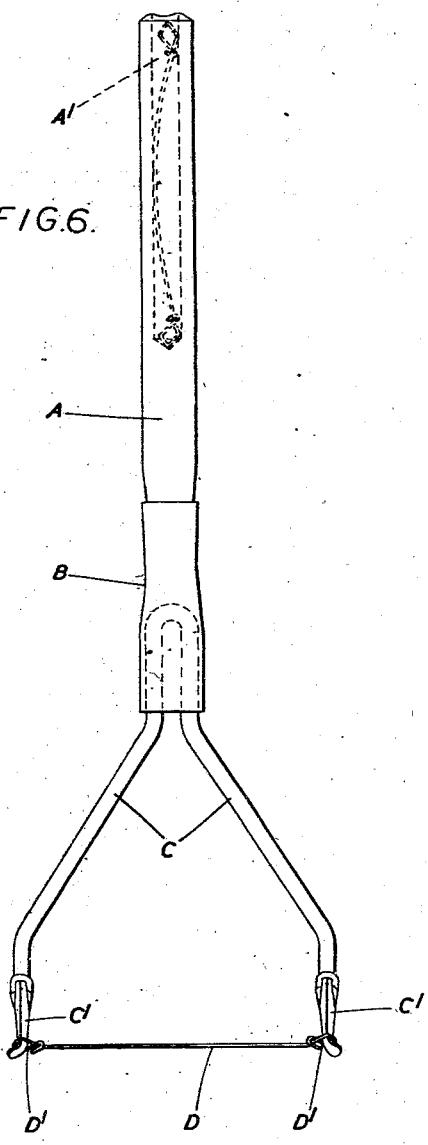
FIG.6.
FIG.7.
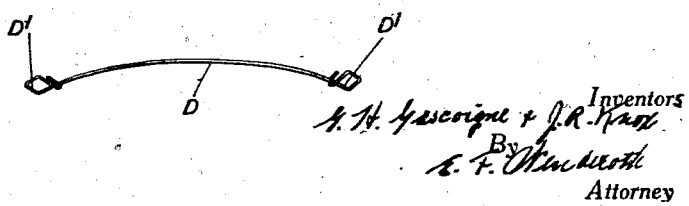
Attorney Patented Apr. 2, 1946

2,397,786

UNITED STATES PATENT OFFICE 2,397,786

HOE

George Harry Gascoigne, Wokingham, and Joseph Rogers Knox, Reading, England

Application May 22, 1943, Serial No. 488,066
In Great Britain May 22, 1942

1 Claim. (Cl. 97—65)

This invention relates to hoes of the kind in which a wire is used in place of a steel blade and has for its object to provide an improved hoe of that kind of light weight, simple and inexpensive in construction, and capable of ready replacement as regards the cutting member proper.

According to the present invention the improved hoe consists of a handle and a head, the latter comprising two divergent arms, a tine detachably secured to the end of each of said arms, and a steel wire the ends of which are formed as loops attached to the aforesaid tines by having the loops slipped over the tips of the tines while the latter are forced slightly towards one another.

The terminal parts of the two divergent arms are preferably set parallel to one another and downwardly out of the plane of the arms to provide an improved angle of approach to the ground. The detachable tine on each arm is also preferably formed as a somewhat thin and broad spearhead longitudinally but with the tip turned outwardly away from the broad surface.

It will be understood that the wire, after having been atttached by slightly forcing the two arms towards one another and slipping the end loops of the wire into position, is prevented from becoming detached during the subsequent dragging action on the wire when the hoe is in use.

The preferred embodiment of the invention is illustrated in the accompanying drawings in which:

Figure 1 is a perspective view,

Figure 2 is a side elevation,

Figure 3 is a sectional elevation of a spear headed terminal portion of one of the arms of the tool head, and Figure 4 is a section on the line 4—4 of Figure 3, Figure 5 is a section on the line 5—5 of Figure 1.

Figure 6 is a front view of the hoe complete with handle having a recess containing a spare wire.

Figure 7 is a view of the spare wire shewn in the handle in Figure 6.

A is the handle which is tightly fitted into the tapered end $B^1$ of a tubular handle socket B, the other end $B^2$ of which carries the stem $C^1$ of the two divergent arms C. The two arms C are preferably parts of a V-shaped member formed as shewn by bending a rod or bar midway in its length into a substantially U-shaped stem with diverging arms and by inserting the stem into the end $B^2$ of the socket, which end is first deformed into oval form to receive the stem portion and is then further deformed to hold and trap the same as shewn in Figure 5.

The divergent arms C have tines $C^2$ secured to their free ends and set at an angle to the plane of the main portions. Each tine $C^2$ is detachable from its arm C, as by screw threading, and is flattened to a broad thin spearhead shape $C^3$ the tip $C^4$ of which is turned outwardly. The planes in which the broad surfaces of the tines lie are such that these then travel "edge-on" during hoeing action, and therefore offer little resistance.

The cutting wire D is formed with a loop $D^1$ at each end of a size and shape suitable for slipping over the corresponding tip $C^4$ of the corresponding tine $C^2$ and for holding the tine against rotation during the hoeing action; as shewn, each tine is substantially diamond shaped in cross section as shewn in Figure 4, and the wire loops are correspondingly kite-shaped, as shewn in Figure 1 to ensure this by the registering of corners of the diamond with corners of the kite.

Each loop $D^1$ is completed by a single hook formation $D^2$ on the free end of the wire to hook over the main portion.

It will of course be understood that when using the improved tool its head is plunged into the loose earth and is then dragged along while the crosswire D cuts the roots of deep seated weeds.

When the cutting wire wears out it is of course renewable easily and at trifling cost.

It is convenient to have a spare cutting wire readily available and for this purpose the hoe handle may be formed with a recess as shewn at $A^1$ in Figure 6 of suitable size and depth to house one or more wires. By imparting to the spare wires a set or deformation as shewn in Figure 7 the wires when inserted in the recess $A^1$ become frictionally held therein until required for use. The depth of the recess is of course such that the outer end of the wires can easily be engaged to enable them to be forcibly withdrawn. The frictional grip renders it unnecessary to provide a plug or cover for the entrance to the recess.

What we claim is:

A hoe comprising a handle, a tubular socket into one end of which the handle is fitted, and a head consisting of a single substantially U-shaped bar having divergent arms, tines detachably secured to the ends of the said arms and having their tips outwardly turned away from one another, and a steel wire the ends of which are formed as loops severally encompassing said tines, the distance between said loops being smaller than the distance between said tips, said arms being yieldable toward each other to reduce the distance between said tips whereby said loops may be slipped thereover into position on the tines, the said U-shaped bar being fitted substantially centrally thereof into the other end of the said socket.

GEORGE H. GASCOIGNE.
JOSEPH R. KNOX.